US012565323B2

(12) United States Patent
Lucienne et al.

(10) Patent No.: US 12,565,323 B2
(45) Date of Patent: Mar. 3, 2026

(54) COWL OF AN AIRCRAFT TURBINE ENGINE COMPRISING A CENTRAL GRIPPING INTERFACE

(71) Applicant: Safran Nacelles, Gonfreville-l'Orcher (FR)

(72) Inventors: Vivien Lucienne, Moissy-Cramayel (FR); Tony Dehais, Moissy-Cramayel (FR); Francois Bellet, Moissy-Cramayel (FR); Pierre Charles Caruel, Moissy-Cramayel (FR)

(73) Assignee: Safran Nacelles, Gonfreville-l'Orcher (FR)

( * ) Notice: Subject to any disclaimer, the term of this patent is extended or adjusted under 35 U.S.C. 154(b) by 0 days.

(21) Appl. No.: 19/137,261

(22) PCT Filed: Dec. 1, 2023

(86) PCT No.: PCT/FR2023/051888

§ 371 (c)(1),
(2) Date: Jun. 9, 2025

(87) PCT Pub. No.: WO2024/126920

PCT Pub. Date: Jun. 20, 2024

(65) Prior Publication Data

US 2026/0008554 A1      Jan. 8, 2026

(30) Foreign Application Priority Data

Dec. 16, 2022      (FR) ....................................... 2213522

(51) Int. Cl.
*B64D 29/00*          (2006.01)
*F01D 25/28*          (2006.01)

(52) U.S. Cl.
CPC ............. *B64D 29/00* (2013.01); *F01D 25/28* (2013.01)

(58) Field of Classification Search
CPC ................................ B64D 29/00; F01D 25/28
See application file for complete search history.

(56) References Cited

U.S. PATENT DOCUMENTS 4,863,354 A      9/1989   Asselin et al.
5,149,251 A  *   9/1992   Scanlon ................. B64C 11/14
                                                       416/224

(Continued)

FOREIGN PATENT DOCUMENTS

EP          0311514 A1      4/1989
FR          2168938 A1      9/1973

(Continued)

OTHER PUBLICATIONS

International Appl. No. PCT/FR2023/051888, International Search Report and Written Opinion with English Translations, dated Feb. 9, 2024, 18 pages.

*Primary Examiner* — Sabbir Hasan
(74) *Attorney, Agent, or Firm* — Kilpatrick Townsend & Stockton LLP

(57) ABSTRACT

The invention relates to a cowl of an aircraft turbine engine extending about an axis, comprising a conical reinforcement centred about the axis, an external skin fixed around the reinforcement, and a revolution member fixed to the conical reinforcement along the axis and against the external skin, the external skin and the revolution member each comprising a hole coaxial with the axis, the revolution member being configured to allow the cowl to be gripped by inserting a bar into the hole.

11 Claims, 12 Drawing Sheets

(56)    References Cited

U.S. PATENT DOCUMENTS

2014/0322026 A1    10/2014 Houradou
2015/0267614 A1*    9/2015 Merlot ..................... F02C 7/04
                                                 415/182.1
2016/0195015 A1    7/2016 Little

FOREIGN PATENT DOCUMENTS

FR            2908827  A1     5/2008
FR            2989733  A1    10/2013
FR            2998620  A1     5/2014
GB            1357712  A      6/1974
WO        2014105668  A1     7/2014

* cited by examiner

COWL OF AN AIRCRAFT TURBINE ENGINE COMPRISING A CENTRAL GRIPPING INTERFACE

CROSS REFERENCE TO RELATED APPLICATIONS

This application is a U.S. national phase under 35 U.S.C. § 371 of International Patent Application No. PCT/FR2023/051888, filed on Dec. 1, 2023, which claims priority to French Patent Application No. 2213522, filed on Dec. 16, 2022, the entire contents of both of which are incorporated herein by reference in their entireties.

TECHNICAL FIELD

The present invention relates to turbine engine inlet cowls as well as systems for handling such inlet cowls.

In particular, the present invention relates to means for attaching and fastening a cowl to a handling system.

In general, the invention applies to any conical industrial part needing to be lifted with a tool, such as the cowls of turbine engines or the rear plugs of nozzles.

PRIOR ART

In general, a turbine engine comprises at the front an inlet cowl having a general conical shape, the end of which may be rounded or not.

The main function of the cowl is to cover the front of the engine shaft of the turbine engine while guiding the air flow to the driving blades of the fan of said turbine engine.

The secondary function of the cowl is to be able to withstand a bird impact and to protect it against icing up.

The cowl is generally heavy, in the order of 20 kg, of conical shape with a circular base, for example with a diameter of about one metre, and with a tip that can be rounded.

The size and the weight of the cowl are all the more significant for applications in open, unducted engines, where the fan has a generally larger diameter than ducted engines, and where the inlet cowl is then also heavier.

In general, the cowl comprises connections, for example air, electrical or hydraulic connections, for example to ensure its anti-icing function.

The cowl also rotates about its axis, in particular at the speed of the blades of the fan.

All of these weight and design constraints require the use of suitable handling tools, also known as Ground Support Equipment (GSE). In particular, the cowl must comprise an interface facilitating handling thereof and/or transport thereof in view of installation thereof on a turbine engine.

For lifting and handling, it is possible to produce interfaces on the cowl in order to fix thereto or handling tools. In general, the interfaces are positioned around the external diameter of the cowl. However, this is the part of the cowl with the greatest aerodynamic impact, the greatest inertia and the greatest impact on the imbalance, the cowl ideally being as balanced as possible.

The cowl must be able to rotate, particularly during the installation thereof in order to install it in the correct position and hence requires, in this embodiment, having many lifting interfaces, hence more weight which may unbalance the cowl.

DISCLOSURE OF THE INVENTION

Hence, the aim of the present invention is to overcome the aforementioned drawbacks and to provide a low-weight interface, not hindering the balance and aerodynamics of the cowl while limiting the rotating weights, and overcoming the angular position constraints of the cowl.

The object of the present invention is a cowl for an aircraft turbine engine, extending about an axis, and comprising a conical reinforcement centred about the axis, an external skin fixed around the reinforcement, the cowl further comprising a revolution member fixed to the conical reinforcement along the axis and against the external skin, the external skin and the revolution member each comprising a hole coaxial with the axis, the revolution member being configured to allow the cowl to be gripped by inserting a bar into the holes.

Thus, the cowl makes it possible for operators with adequate handling tools to carry out transport, maintenance and installation of the cowl in a simpler way, with the revolution member constituting a balanced handling interface with a single fixing point, minimising mechanical stresses. In particular, no lifting interface is required on the external diameter of the cowl, which contributes to better aerodynamics, with no imbalance. The cowl may also be oriented in rotation according to any angle, unlike the prior art, where the rotation is limited by the presence of a sling fixed to the external diameter of the cowl. This is particularly useful following a stoppage of the turbine engine, in which case the cowl is in a random position and must be able to be gripped in any position. The revolution member may also be used as a reference member when manufacturing the cowl.

Advantageously, the hole of the revolution member passes through the revolution member.

In one embodiment, the cowl is a turbine engine fan nose.

In a particular embodiment, the revolution member comprises a longitudinal locking means, preferably a thread oriented towards the hole.

In one embodiment, the hole comprises a means configured to brake and/or immobilise in rotation about the axis the bar inserted into the hole.

Advantageously, the revolution member comprises an annular shoulder extending into the hole of the external skin at the end of the hole of the revolution member.

Advantageously, the cowl comprises a plurality of orifices around the hole, the holes extending through the external skin and into the revolution member.

Another object of the invention is an assembly comprising a cowl as defined before and a plug for plugging the hole.

Advantageously, the revolution member and the plug each comprise a thread, these threads cooperating so that the plug is held on the revolution member.

Another object of the invention is an aircraft turbine engine comprising an assembly as defined previously and a fan rotating in a direction of rotation during the operation thereof, the direction of the threads being reversed with respect to the direction of rotation of the fan, the cowl being a fan nose.

Another object of the invention is an aircraft comprising an aircraft turbine engine as defined before.

BRIEF DESCRIPTION OF THE DRAWINGS

Other aims, features and advantages of the invention will become apparent upon reading the following description, given merely as a non-limiting example, and made with reference to the appended drawings, wherein.

DETAILED DISCLOSURE OF AT LEAST ONE EMBODIMENT

Figure 1:
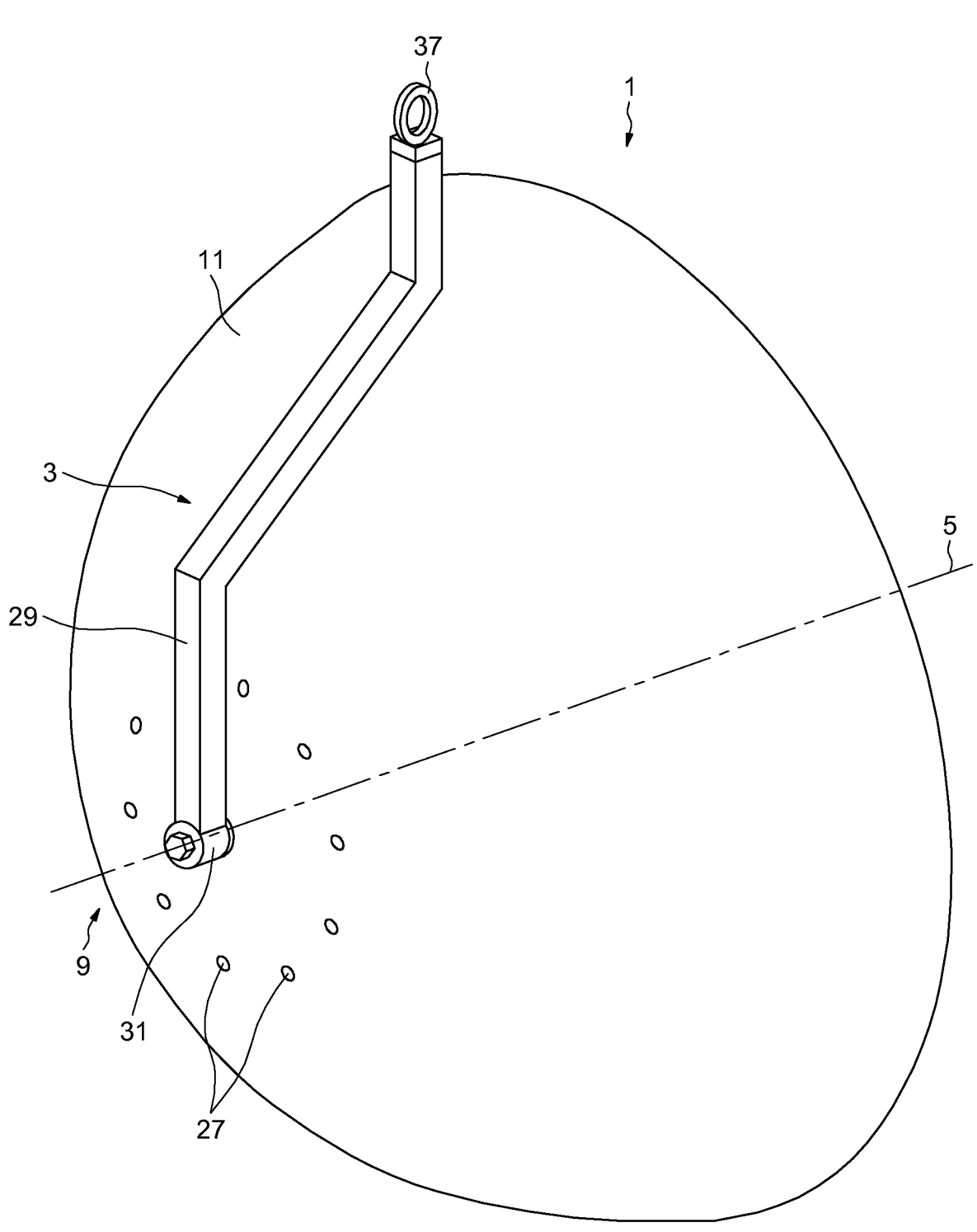
FIG. 1 is a view of an embodiment of a tool for handling a cowl according to the invention.

FIG. 1 schematically shows one embodiment of a rotating industrial part 1 as well as one embodiment of a handling tool 3 configured to make it possible to lift said rotating industrial part 1.

A revolution industrial part is any industrial part comprising an axis about which the industrial part has a symmetry of revolution. The industrial part is, for example, cylindrical, conical, spherical, etc.

In the illustrated embodiment, the industrial part is a cowl 1 of an aircraft turbine engine. For example, the aircraft turbine engine is a turbojet engine, in particular a turbofan engine, or a turboprop.

By cowl 1, it should be understood an inlet cowl, also called a nose spinner, which corresponds to the central cone upstream of a turbine engine fan. By cowl, it should also be understood a central rear plug of a turbine engine nozzle.

The cowl 1 illustrated in FIG. 1 is an inlet cowl of a turbine engine comprising an axis 5. In particular, the axis 5 is coaxial with the axis of rotational symmetry and is intended to be coaxial and connected with the axis of rotation of the turbine engine.

Figure 2:
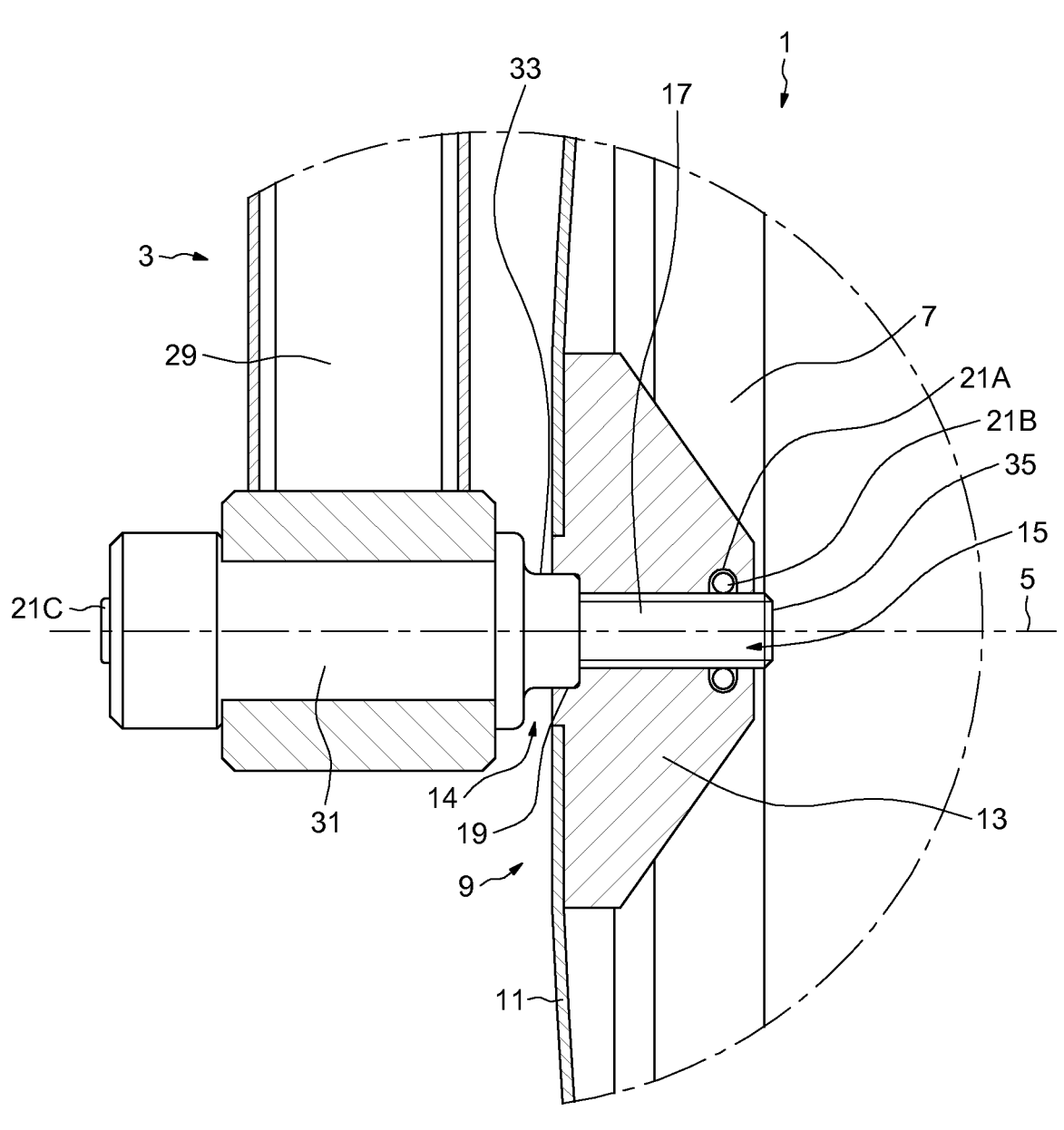
FIG. 2 is a sectional view of a detail of FIG. 1.

FIG. 2 shows a sectional view of a detail of FIG. 1.

The cowl 1 comprises a conical reinforcement 7 centred about the axis 5, the conical tip 9 of the reinforcement 7 passing through the axis 5.

By conical, it should be understood any shape having a circular base wider than the tip 9, the tip 9 could be flattened, as illustrated in FIG. 1. Hence, by conical, it should be understood any shape of the ogive, cone, dome type, etc.

The conical reinforcement 7 is made of a material resistant to the pressure conditions subjected upstream of an aircraft turbine engine.

The cowl 1 comprises an external skin 11 fixed around the conical reinforcement 7, so as to protect the reinforcement 7 and form a smooth and aerodynamic lining.

The external skin 11 comprises for example carbon and/or aluminium. The external skin 11 has a thickness comprised between 1 and 5 millimetres, preferably 2 millimetres.

The cowl 1 further comprises a revolution member 13 attached to the conical frame 7 along the axis 5 and against the external skin 11. In particular, the revolution member 13 is positioned at the conical tip 9 of the cowl 1. In addition, in the presence of the revolution member 13, the external skin 11 is fixed on the revolution member 13.

The revolution member 13 comprises in particular a metal material, in particular aluminium, and/or a composite material. The material used for the revolution member 13 is robust and allows the plug 1 to be gripped and lifted by means of said revolution member 13. For this purpose, the thickness of the revolution member 13 is comprised between 3 and 25 centimetres. The shape of the revolution member 13 can be modified, the latter could serve as a material reserve for balancing the cowl 1.

Considering a positioning at the tip 9 of the cowl 1, the revolution member 13 also allows representing a good reference for other applications, for example for manufacturing the cowl 1.

The external skin 11 and the revolution member 13 further comprise a hole 14 and a hole 15 respectively. These holes 14 and 15 are aligned with each other and coaxial with the axis 5. Thus, the handling tool 3, which comprises a bar 17, in particular a bar 17 with a diameter less than or equal to that of the holes 14 and 15, allows the cowl 1 to be gripped and lifted by inserting said bar 17 into the holes 14 and 15.

The revolution member 13 thus creates a handling interface. The positioning thereof in the centre of the cowl 1 makes better balancing possible without imbalance and without the need for a plurality of sling rings on the periphery of the cowl 1. Handling is facilitated and the aerodynamic performances of the cowl 1 are improved.

In a particular embodiment, the hole 15 completely passes through the revolution member 13. Thus, a bar 17 inserted into the hole 15 can protrude from the other side of the revolution member 13 in order, for example, to fix it and prevent it from disengaging.

The through holes 14 and 15 also make it possible to carry out endoscopic checks, or to be able to introduce cables or tubes into the cowl 1 by means of the holes 14 and 15, for example to carry out an installation or maintenance of a device such as an anti-icing device.

The holes 14 and 15 make it possible, in addition to the insertion of a handling tool 3, to insert a holding tool for transporting the cowl.

In a particular embodiment, the revolution member 13 comprises an annular shoulder 19. More specifically, the hole 15 has a wider diameter at the tip 9 of the cowl 1, the diameter of the hole 15 narrowing in the revolution member 13 so as to form said annular shoulder 19. The shoulder 19 makes it possible to improve the take-up of rotational forces.

Optionally, the hole 15 may comprise a simple bore, in other words comprise a smooth inner surface, in other words not threaded.

Alternatively, the hole 15 comprises a means for longitudinally locking the bar 17 along the axis 5. For example, the locking means comprises a thread on the inner surface of the hole 15. In other words, the revolution member 13 comprises a thread oriented towards the hole 15.

The thread can thus make better attachment of a bar 17 threaded in the hole 15 possible, although a handling tool 3 with a non-threaded bar 17 can still be used.

Optionally, the hole 15 comprises a means 21A configured to brake and/or immobilise the bar 17 inserted into the hole 15. In other words, the revolution member comprises the means 21A at the hole 15. This means 21A makes it possible to guarantee the holding of the bar 17 in the cowl 1 during handling in order to avoid any accident at the handling location. The means 21A is for example a cavity 21A configured to receive and lock one or more balls 21B of a ball spindle comprised in the bar 17 and the radial movement of the balls of which can be activated by a button 21C positioned outside the hole 15 so as to be accessible by an operator.

Figure 3:
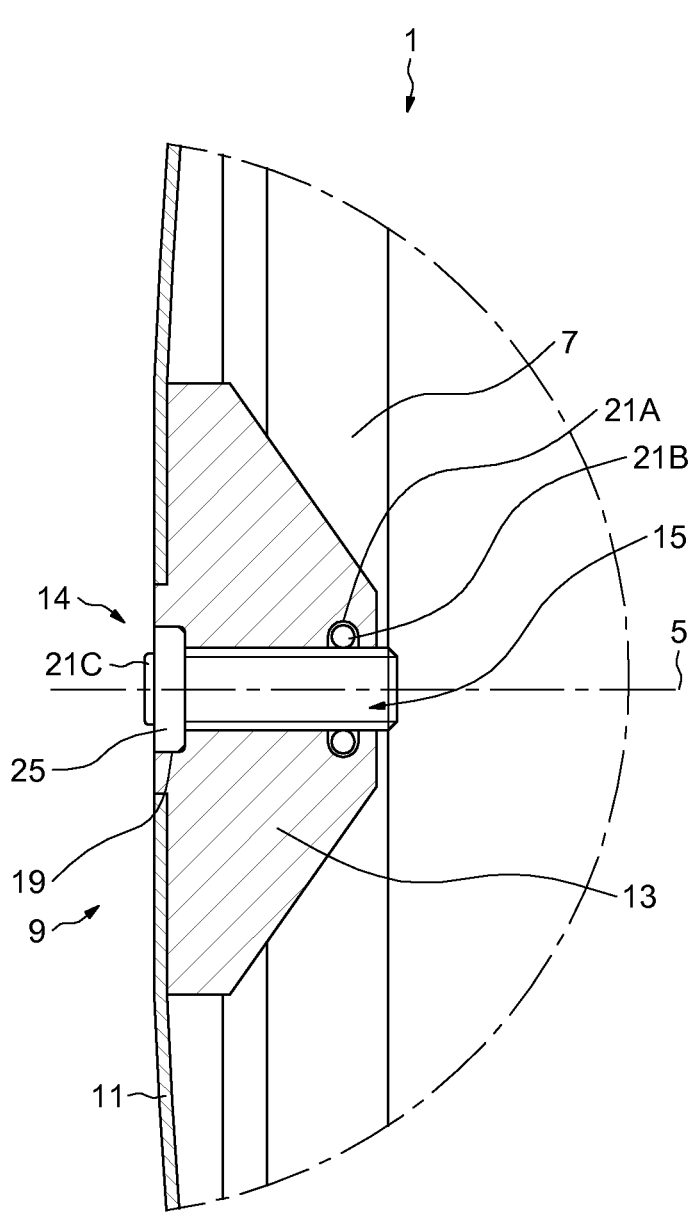
FIG. 3 is a sectional view of an assembly comprising a cowl and a plug according to the invention.

FIG. 3 shows a sectional view of a detail of one embodiment of an assembly 23 according to the invention. The assembly comprises a cowl 1 as illustrated in FIGS. 1 and 2, as well as a plug 25 configured to plug the hole 15 when the cowl 1 is attached to an aircraft turbine engine.

Indeed, the presence of the hole 15 in the cowl 1 could be detrimental to the aerodynamics of the aircraft once the cowl 1 is installed on a turbine engine of said aircraft. Moreover, during flight, compressed air at over 600 km/h would enter the cowl 1, while on the ground, animals could nest in the cowl 1. Thus, installing a plug 25 at the end of the hole 15 is advantageous. In particular, the plug 25 can be threaded, just like the hole 15, so as to be screwed into the hole 15. For example, the plug 25 bears on the shoulder 19, if applicable.

In a particular embodiment, the direction of the thread of the hole 15 is reversed with respect to the direction of rotation for which the cowl 1 is designed, in other words with respect to the direction of rotation of the fan when the cowl 1 is a fan nose. For example, if the turbine engine in operation for which the cowl 1 is intended rotates in a first direction, the thread of the hole 15 must be oriented in the opposite direction. This embodiment makes it possible to prevent the hole 15 from clogging itself during flight of the aircraft. Advantageously, the plug 25 is thus tightened more autonomously during flight.

In the embodiment for which the hole 15 comprises a means 21A configured to brake and/or immobilise the bar 17 in the hole 15, said means 21A can also make it possible to immobilise the plug 25 when the latter is put in place.

Figure 4:
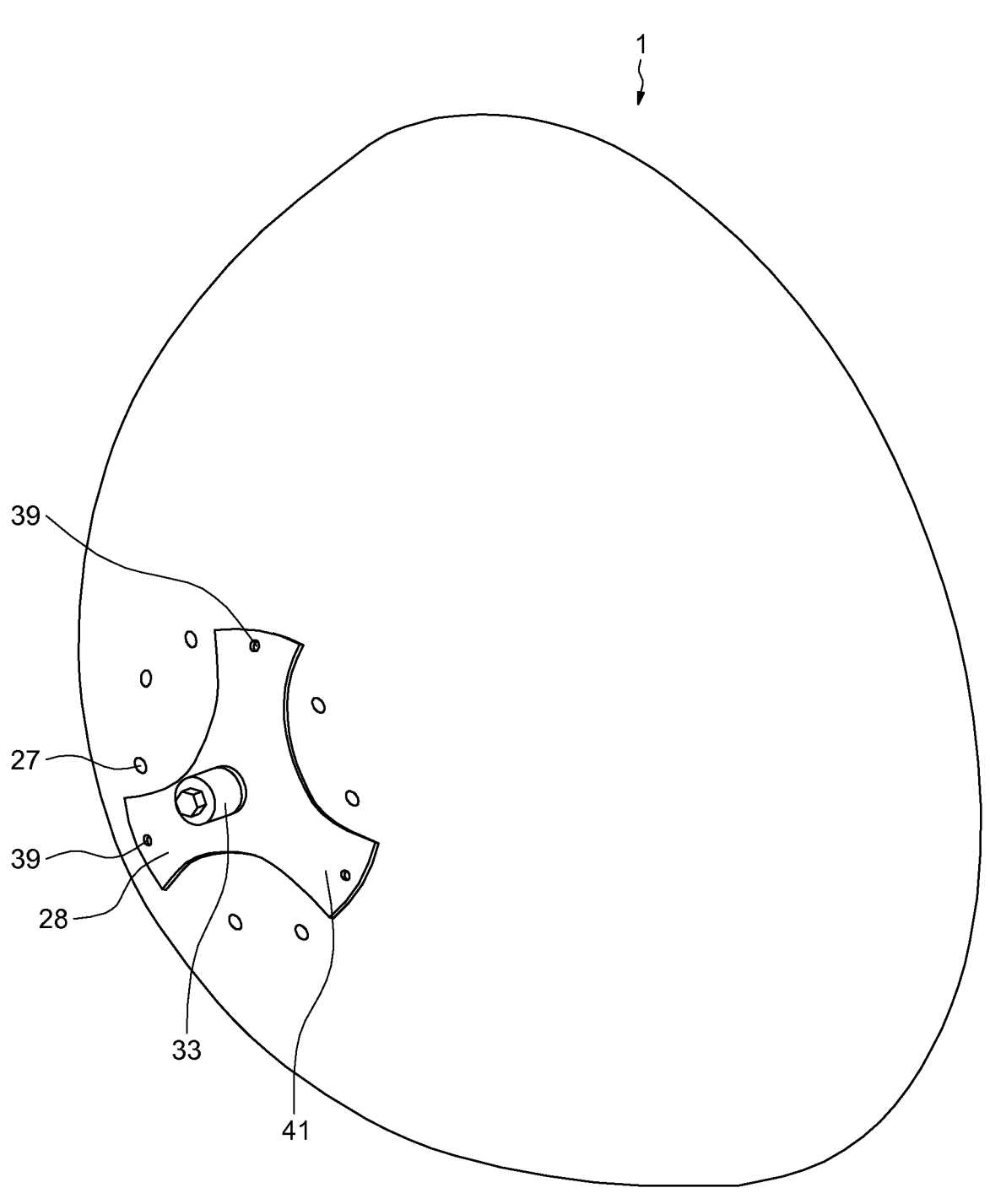
FIG. 4 is a view of a particular embodiment of a handling tool according to the invention.

Optionally, the cowl 1 comprises a plurality of orifices 27 made around the hole 15, the holes 27 extending through the external skin 11 and into the revolution member 13, for example in the form of threaded bushings normal to the surface of the cowl 1. The orifices 27 allow inserting screws in order to fasten a flange 28 of the handling tool 3 to the cowl 1 as illustrated in FIG. 4. The assembly 23 of the cowl 1 and of the plug 25 also comprises a plurality of caps (not shown) allowing plugging the plurality of orifices 27 and preventing air from entering the cowl 1.

The cowl 1 is generally configured to be used with the handling tool 3 described hereinafter.

In the embodiment illustrated in FIG. 1, the handling tool 3 comprises a body 29 and a bar 17 such as the bar 17 presented previously. The bar 17 extends along its longitudinal axis distally from the body 29. Thus, the bar 17 is configured to be inserted into a hole of a revolution industrial part such as the previously-described hole 15. For example, the body 29 is connected to the bar 17 by means of a pivot connection 31 as illustrated in FIG. 2. The bar 17 comprises a first end 33 in contact with the pivot connection 31 as well as a second end 35 intended to be inserted into the hole 15. The bar 17 is optionally threaded.

The tool 3 is configured to make it possible to rotate the bar 17 with respect to the body 29 and about the longitudinal axis of said bar 17, the longitudinal axis of the bar 17 being intended to be coaxial with the axis 5.

Optionally, the tool 3 comprises a means 21B configured to brake and/or immobilise in rotation the bar 17 inserted into the hole 15. This means 21B makes it possible to guarantee the holding of the bar 17 in the cowl 1 during handling in order to avoid any accident at the handling location. The means is for example one or more balls 21B of a ball spindle comprised in the bar 17 and the radial movement of the balls of which can be activated by a button 21C positioned outside the hole 15 so as to be accessible by an operator. The balls 21B are configured so as to be received and locked in a cavity 21A of the hole 15.

Thus, when the bar 17 is inserted into the hole 15, the bar 17 comprising a shoulder bearing on the shoulder 19 where applicable, it can make it possible to lift the rotating industrial part 1 and in particular makes it possible to rotate the industrial part 1. By way of example, the industrial part illustrated is the cowl 1 described previously.

In the embodiment illustrated in FIG. 1, the tool 3 comprises a lifting ring 37 configured to be attached to a lifting sling and positioned vertically to the centre of gravity of the assembly comprising the tool 3 and the cowl 1.

Thus, the tool 3 allows lifting the cowl 1, for example so as to install it on an aircraft turbine engine, and simultaneously performing the necessary connections and screwing.

FIG. 4 shows a particular embodiment of a handling tool 3 as well as a cowl 1 as illustrated in FIG. 1.

In FIG. 4, the body 29 of the handling tool 3 is not shown.

The tool 3 comprises a force distribution flange 28 extending radially from the first end 33 of the bar 17 and having a conical shape, more precisely complementary to the shape of the cowl 1, in particular complementary to the tip 9 of the cone formed by the cowl 1. The flange 28 thus makes it possible to distribute the lifting and rotation forces elsewhere than at the bar 17 and the hole 15 by contact between the flange 28 and the cowl 1.

Optionally, the flange 28 comprises screws 39 for fastening the flange 28 to the cowl 1. The fastening screws 39 are inserted, for example, into the orifices 27 of the cowl 1. The flange 28 comprises for example three lobes 41, each lobe 41 comprising at least one screw 39 for fixing the flange 28 to the cowl 1.

Figure 5:
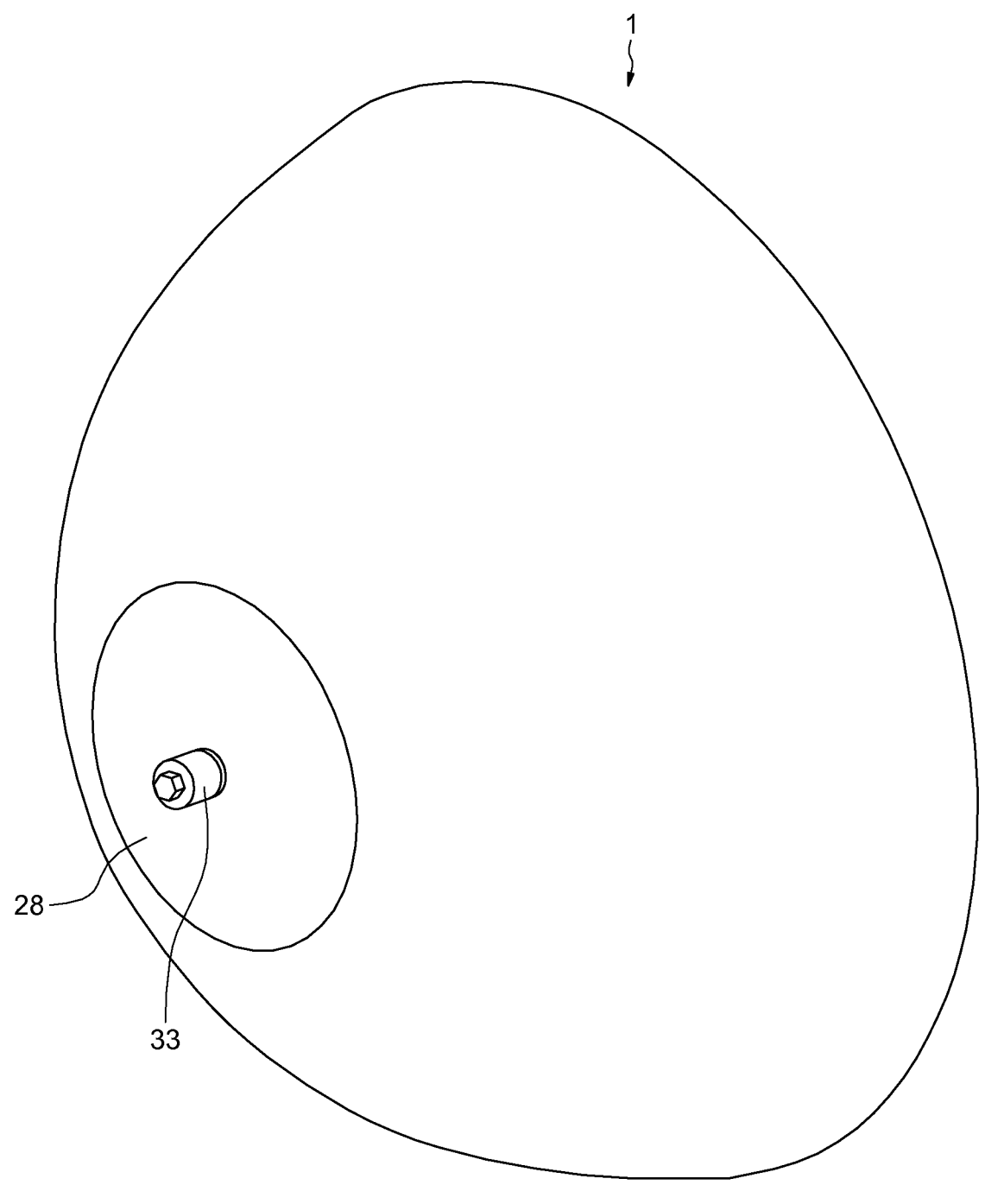
FIG. 5 is a view of a variant of FIG. 4.

FIG. 5 shows a variant of FIG. 4 wherein the flange 28 does not comprise a fastening screw 39, only the contact of the flange 28 with the cowl 1 allowing force distribution.

Figure 6:
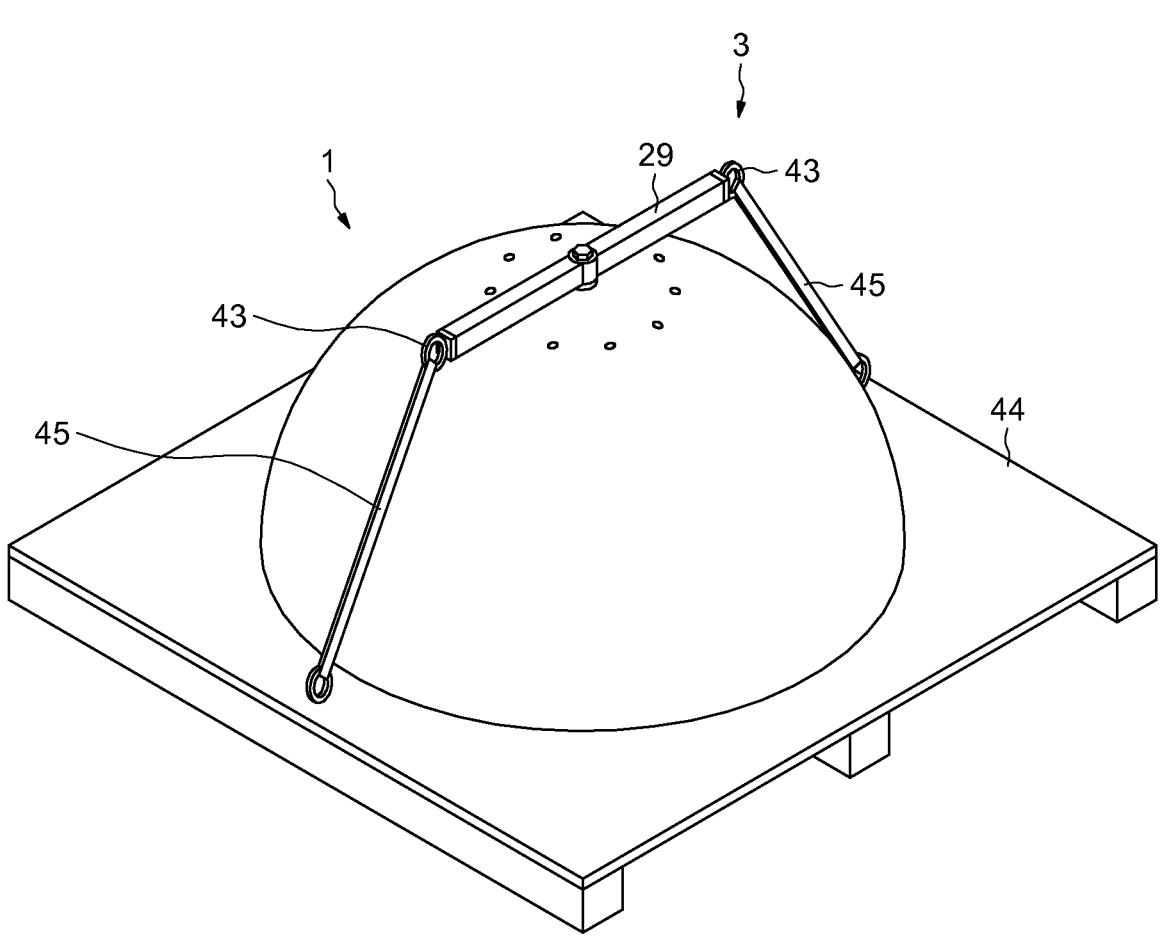
FIG. 6 is a view of an embodiment of a handling tool according to the invention adapted for transporting a cowl.

FIG. 6 shows a particular embodiment of a handling tool 3, as well as a cowl 1 according to FIG. 1.

In this embodiment, the handling tool 3 comprises several rings 43, for example lifting rings, making it possible to attach the cowl 1 to a base 44 and to transport it easily, for example using straps 45.

Figure 7:
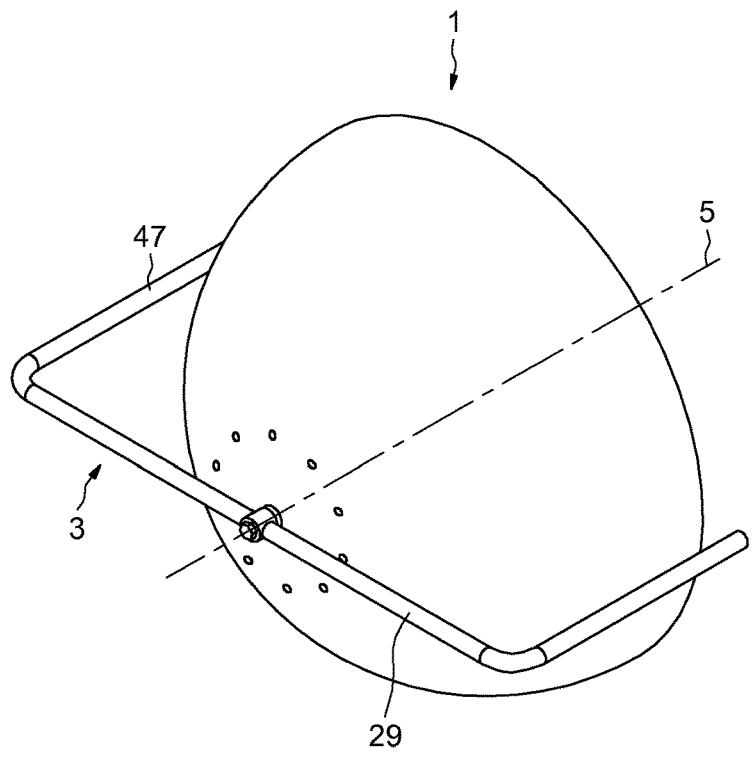
FIG. 7 is a view of one embodiment of a handling tool comprising lifting handles.

FIG. 7 shows a particular embodiment of the handling tool 3 as well as a cowl 1 similar to that of FIG. 1.

The handling tool 3 comprises lifting handles 47 which can be gripped by one or more operator(s).

In this embodiment, two operators can support the cowl 1 while a third performs installation or maintenance operations. The cowl 1 can be rotated according to its axis 5, for example by rotating it by hand.

Figure 8:
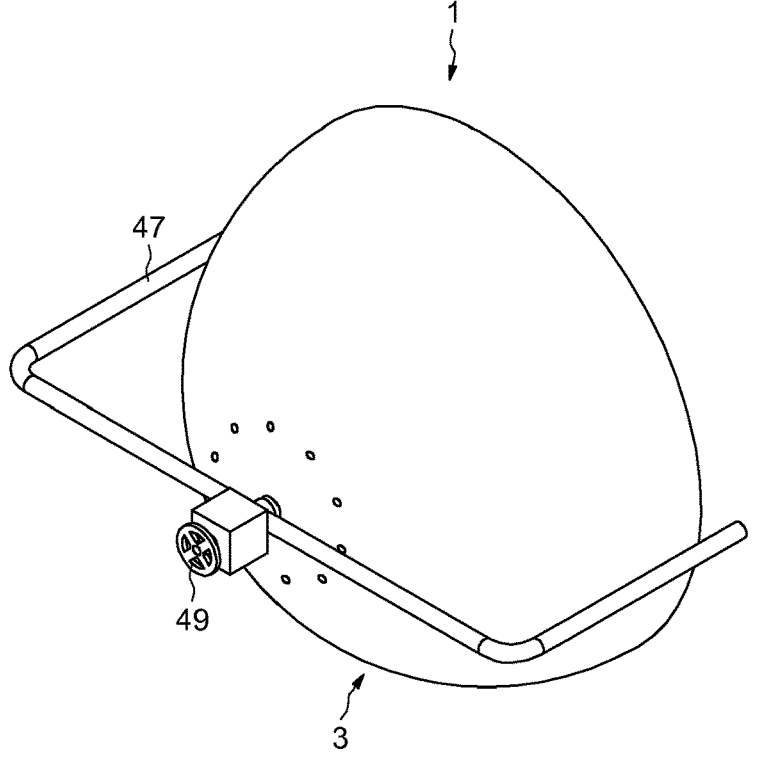
FIG. 8 is a view of one embodiment of a handling tool comprising lifting handles and a rotation wheel.

An alternative embodiment of FIG. 7 has been shown in FIG. 8.

In this alternative embodiment, the tool 3 comprises a member 49 for rotating the bar 17 about the longitudinal axis thereof. The member 49 thus facilitates a more precise rotation. For example, the member 49 is a control wheel.

Figure 9:
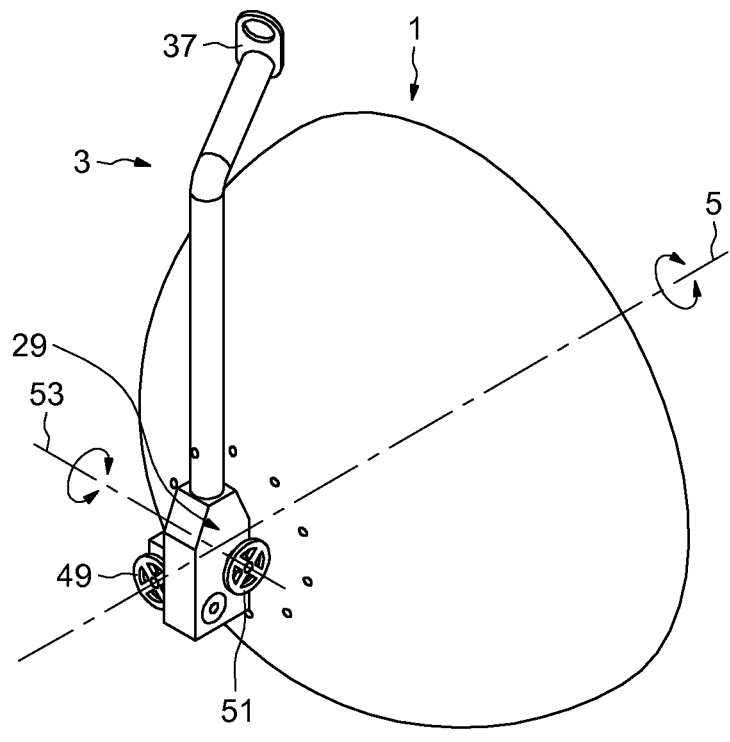
FIG. 9 is a view of one embodiment of a handling tool comprising a lifting ring and two rotation wheels.

FIG. 9 shows another embodiment of a handling tool 3 as well as a cowl 1.

In this embodiment, the tool 3 comprises a lifting ring 37 positioned vertically to the centre of gravity of the assembly comprising the tool 3 and the cowl 1, a member 49 for rotating the bar 17 about the longitudinal axis thereof, intended to be coaxial with the axis 5, as well as a device 51 for rotating the bar 17 about a second axis 53 orthogonal to the longitudinal axis of the bar 17. The second axis 53 is in particular horizontal when the cowl 1 is in position to be installed on the turbine engine.

The device 51 is for example a control wheel. In particular, it makes it possible to move the cowl 1 from a transport position as illustrated in FIG. 6 to an installation position as illustrated in FIG. 9.

Figure 10:
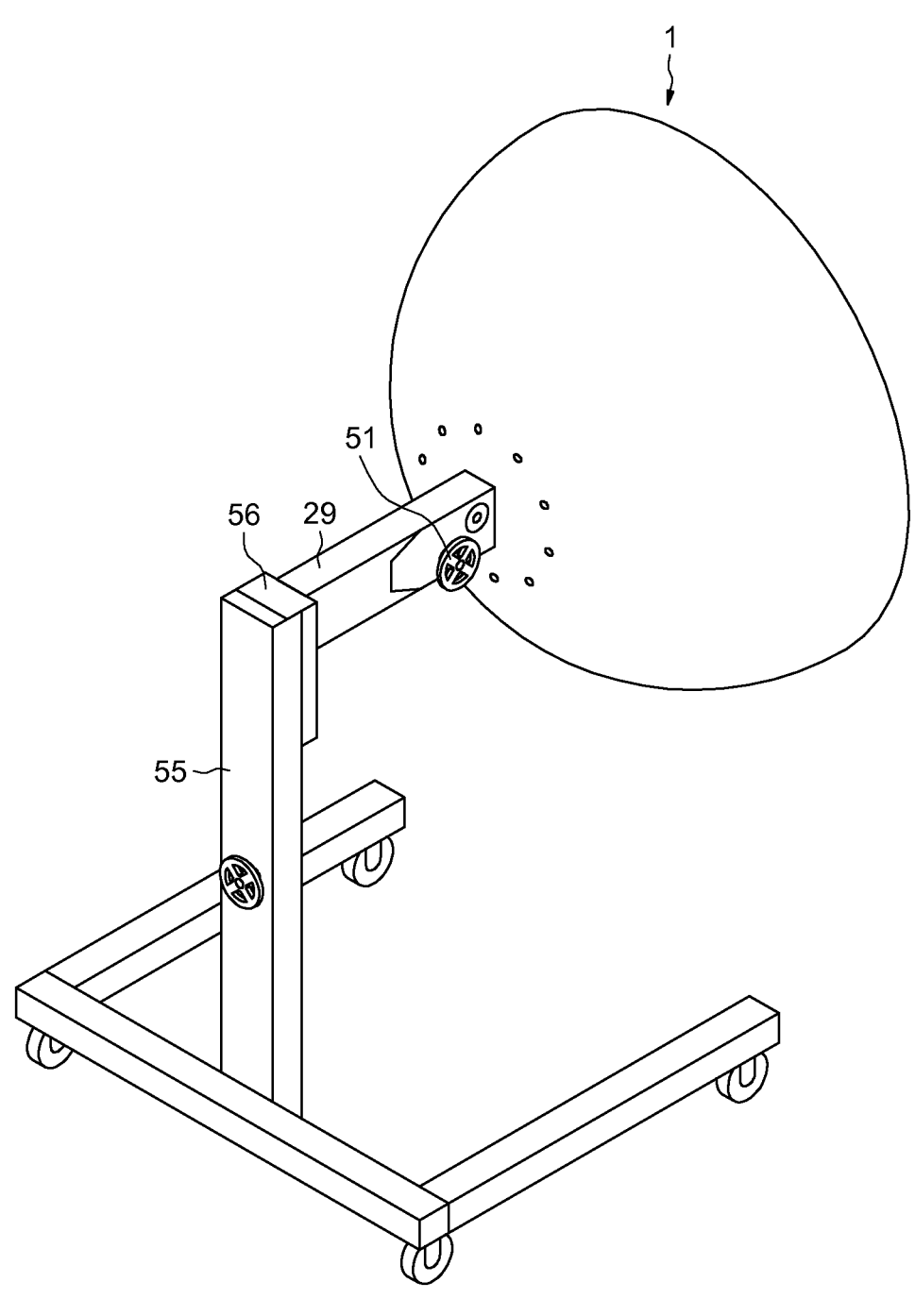
FIG. 10 is a view of one embodiment of a handling tool comprising a forklift.

FIG. 10 shows another embodiment of the handling tool 3.

In this embodiment, the handling tool 3 comprises a forklift 55 connected to the body 29 and making it possible to support the body 29. The forklift 55 comprises a means 56 for adjusting the height of the body 29, for example using a crank or a control wheel, in view of installing or holding the cowl 1 on the turbine engine for example. For example, the forklift 55 comprises castors allowing it to be movable.

Figure 11:
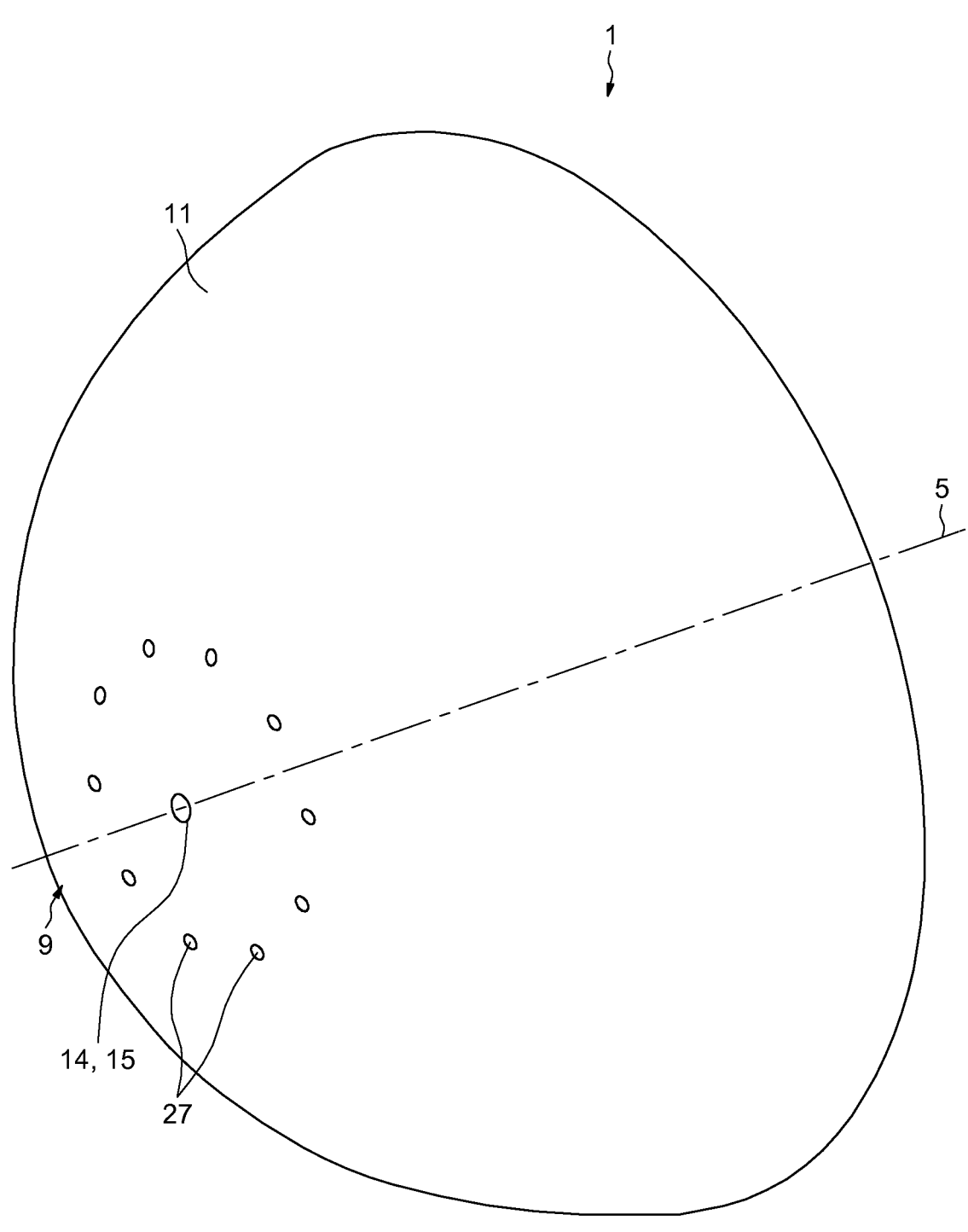
FIG. 11 is a view of an embodiment of a cowl according to the invention.

For the purpose of clarification, only a cowl 1 is shown in FIG. 11. In the embodiment shown, the holes 14 and 15 formed respectively in the external skin 11 and the revolution member 13 are illustrated. In addition, the cowl 1 comprises a plurality of orifices for fastening a flange 28.

Figure 12:
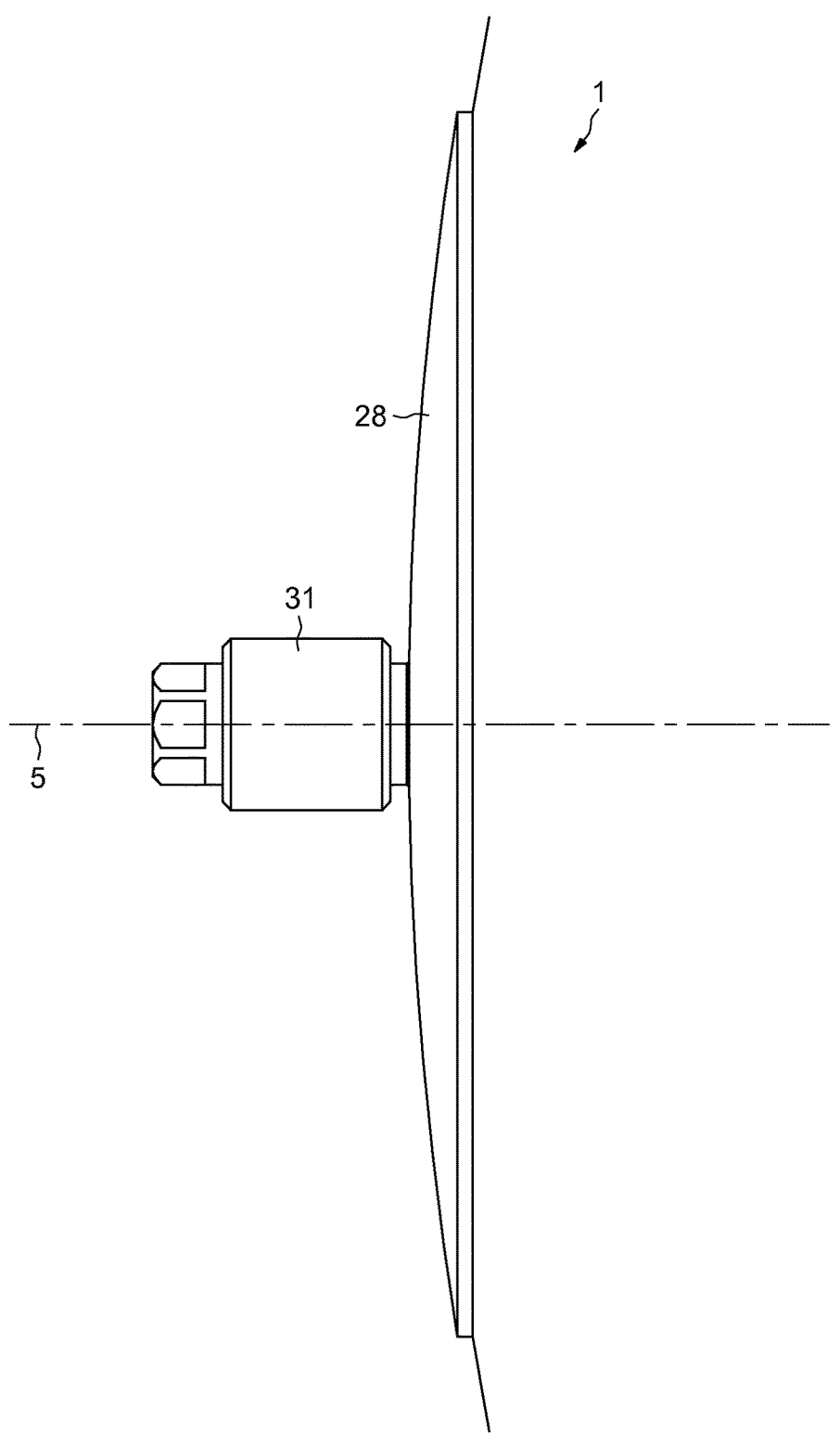
FIG. 12 is a detailed view of one embodiment of a handling tool comprising a flange held against the cowl according to the invention.

FIG. 12 also shows a detailed view of a handling tool 3. The detail illustrates the pivot connection 31 as well as the flange 28 held on the cowl 1.

Figure 13:
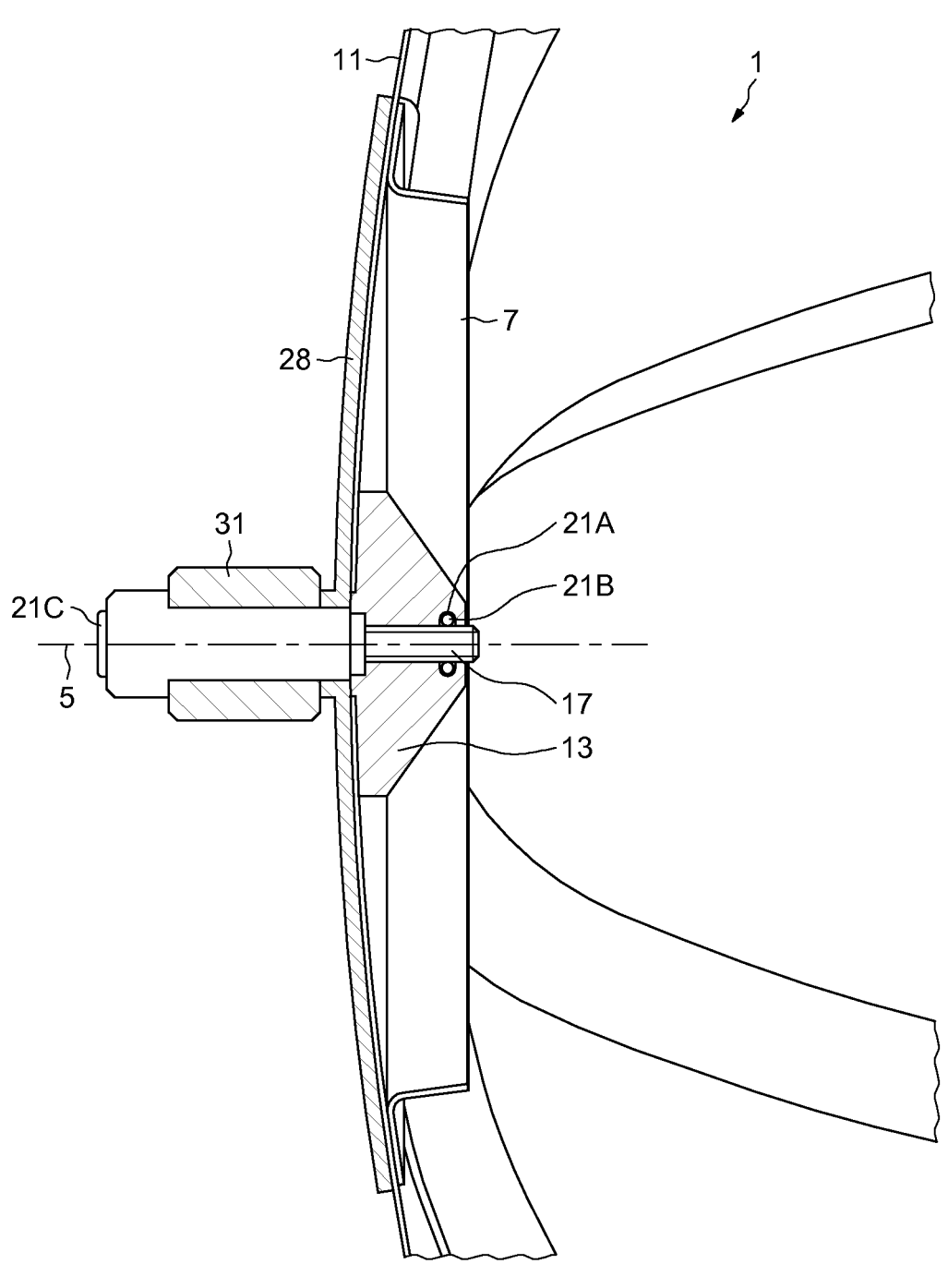
FIG. 13 is a sectional view of the tool illustrated in FIG. 12.

FIG. 13 is a cross-sectional view of the embodiment illustrated in FIG. 12 and illustrates a pivot connection 31 at the end of which the bar 17 is positioned, for example made of material with the flange 28.

All of the previously-described embodiments are compatible with one another. In particular, the tool 3 may comprise both lifting handles 47, a lifting ring 37 as well as a forklift 55, as well as one and/or the other of the member and device 49 and 51.

The invention claimed is:

1. A cowl for an aircraft turbine engine, extending about an axis, and comprising a conical reinforcement centred about the axis, an external skin fixed around the conical reinforcement, and a revolution member fixed to the conical reinforcement along the axis and against the external skin, the external skin and the revolution member each comprising a hole coaxial with the axis, the revolution member being configured to allow the cowl to be gripped by inserting a bar into the holes.

2. The cowl according to claim 1, wherein the hole of the revolution member passes through the revolution member.

3. The cowl according to claim 1, the cowl being a turbine engine fan nose.

4. The cowl according to claim 1, wherein the revolution member comprises a longitudinal locking means.

5. The cowl according to claim 1, wherein the hole of the revolution member comprises a means configured to brake and/or immobilise in rotation about the axis the bar inserted into the hole of the revolution member.

6. The cowl according to claim 1, wherein the revolution member comprises an annular shoulder extending into the hole of the external skin at an end of the hole of the revolution member.

7. The cowl according to claim 1, comprising a plurality of orifices around the hole of the revolution member, the orifices extending through the external skin and into the revolution member.

8. An assembly comprising the cowl according to claim 1 and a plug for plugging the hole of the revolution member.

9. The assembly according to claim 8, wherein the revolution member and the plug each comprise a thread, these threads cooperating so that the plug is held on the revolution member.

10. An aircraft turbine engine comprising the assembly according to claim 9 and a fan rotating in a direction of rotation during an operation thereof, the direction of the threads being reversed with respect to the direction of rotation of the fan, the cowl being a fan nose.

11. The cowl according to claim 4, wherein the longitudinal locking means comprises a thread oriented towards the hole of the revolution member.

* * * * *